United States Patent
Hampton

(10) Patent No.: US 12,454,888 B2
(45) Date of Patent: Oct. 28, 2025

(54) SYSTEMS AND METHODS FOR DETERMINING MECHANICAL PROPERTIES IN SUBSURFACE FORMATIONS

(71) Applicant: WISCONSIN ALUMNI RESEARCH FOUNDATION, Madison, WI (US)

(72) Inventor: Jesse Hampton, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 623 days.

(21) Appl. No.: 17/715,551

(22) Filed: Apr. 7, 2022

(65) Prior Publication Data

US 2022/0228482 A1  Jul. 21, 2022

Related U.S. Application Data

(63) Continuation of application No. PCT/US2020/054950, filed on Oct. 9, 2020.

(60) Provisional application No. 62/914,008, filed on Oct. 11, 2019.

(51) Int. Cl.
*E21B 47/007* (2012.01)
*E21B 49/00* (2006.01)

(52) U.S. Cl.
CPC .......... *E21B 49/006* (2013.01); *E21B 47/007* (2020.05)

(58) Field of Classification Search
CPC ....... G01L 1/242; E21B 47/007; E21B 49/006
See application file for complete search history.

(56) References Cited

U.S. PATENT DOCUMENTS

| 8,800,653 | B2 * | 8/2014 | Dria ........................ E21B 47/07 |
| | | | 166/253.1 |
| 10,060,244 | B2 | 8/2018 | Nguyen et al. |
| 2003/0150263 | A1 | 8/2003 | Economides et al. |
| 2012/0205103 | A1 | 8/2012 | Ravi et al. |
| 2014/0321240 | A1 | 10/2014 | Barnes et al. |
| 2016/0069182 | A1 | 3/2016 | Neale et al. |
| 2018/0202281 | A1 * | 7/2018 | Leblanc ................ E21B 47/005 |
| 2018/0293789 | A1 | 10/2018 | Shen et al. |

(Continued)

OTHER PUBLICATIONS

Brace et al., "Limits on Lithospheric Stress Imposed by Laboratory Experiments," Journal of Geophysical Research, vol. 85, No. B11 pp. 6248-6252, Nov. 10, 1980.

(Continued)

*Primary Examiner* — Erika J. Villaluna
(74) *Attorney, Agent, or Firm* — Seager, Tufte & Wickhem, LLP

(57) ABSTRACT

A system for monitoring and establishing mechanical properties of a formation may include a strain sensing system and a controller. The strain sensing system may include an elongated fiber, a light emitter, and a detector. The elongated fiber may be or may include a fiber optic cable. Monitoring and establishing mechanical properties of a wellbore may include determining a stress applied to a casing of a length of the wellbore and sensing, with the strain sensing system, a strain that may be resultant from the stress applied to the casing. Based on the stress applied to the casing and the sensed strain, the controller may determine a value related to a mechanical property of the formation extending along the wellbore.

12 Claims, 7 Drawing Sheets

(56) References Cited

U.S. PATENT DOCUMENTS

2019/0203574 A1    7/2019  Yi et al.

OTHER PUBLICATIONS

Drake et al., "Distributed Strain Sensing from Different Optical Fiber Configuations," Inventions, vol. 3, No. 67, pp. 1-11, 2018.

Eaton, "Fracture Gradient Prediction and its Application in Oilfield Operations," Journal of Petroleum Technology, vol. 246, pp. 1353-1360, Oct. 1969.

Engelder, "Stress Regimes in the Lithosphere," 486 Pages, Princeton University Press, 1993. (Overview and Contents pages Only).

Jaeger et al., "Fundamentals of Rock Mechanics," Fourth Edition, 489 Pages, Blackwell Publishing, 2007.

Lei et al., "Fiber Optic Sensing for Geomechanical Monitoring: (2)-Distributed Strain Measurements at a Pumping Test and Geomechanical Modeling of Deformation of Reservoir Rocks," Applied Sciences, vol. 9, No. 417, pp. 1-14, 2019.

Naldrett et al., "Production Monitoring Using Next-Generation Distributed Sensing Systems," Petrophysics, vol. 59, No. 4, pp. 496-510; Aug. 2018.

Savage et al., "On the State of Stress in the Near-Surface of the Earth's Crust," Pure Appl. Geophysics, vol. 138, No. 2, pp. 207-228, 1992.

Terzaghi et al., "Stresses in Rock about Cavities," G'eotechnique, vol. 3, No. 2, pp. 57-90, 1952.

Thiercelin et al., "Core-Based Prediction of Lithologic Sress Contrasts in East Texas Formations," SPE Formation Evaluation (Society of Petroleum Engineers); (United States) vol. 9, No. 4, pp. 251-258, Dec. 1, 1994. Accessed Jul. 7, 2022.

Trzeciak et al., "Stress Distribution Models in Layered, Viscoelastic Sedimentary Basins under Tectonic and Glacial Loads," Geophys. J. Int pp. 1-22, 2022.

Warpinksi, "Elastic and Viscoelastic Calculations of Stress in Sedimentary Basins," SPE Formation Evaluation, 4, 3 pages, Jan. 1, 1986.

Warpinksi, "Elastic and Viscoelastic Model of the Stress History of Sedimentary Rocks," Tech. Rep. Sand 86-0238, Sandia National Laboratories, 3 pages, Apr. 1, 1986.

International Report on Patentability for International Application No. PCT/US2020054950, mailing date Apr. 21, 2022.

International Search Report and Written Opinion for International Application No. PCTUS2020054950, mailing date Dec. 4, 2020.

\* cited by examiner

SYSTEMS AND METHODS FOR DETERMINING MECHANICAL PROPERTIES IN SUBSURFACE FORMATIONS

CROSS REFERENCE TO RELATED APPLICATIONS

This application is a continuation of International Application No. PCT/US2020/054950, filed on Oct. 9, 2020, which claims the benefit of U.S. Provisional Patent Application Ser. No. 62/914,008 filed on Oct. 11, 2019, the disclosures of which are incorporated herein by reference.

TECHNICAL FIELD

The present disclosure pertains to monitoring systems and assessment tools, and the like. More particularly, the present disclosure pertains to strain monitoring systems and systems for determining mechanical properties and stress states in subsurface formations.

BACKGROUND

A wellbore may be a hole that is drilled through a subsurface to aid in exploration and recovery of natural resources (e.g., oil, gas, water, heat from geothermal, etc.), to aid in reaching a subsurface reservoir, and/or to aid in one or more other suitable functions. A subsurface reservoir may be a subsurface space containing one or more recoverable natural resources, a subsurface space used to treat a transport fluid (e.g., a geothermal reservoir), etc. After a wellbore is formed, subsurface stress measurements may be made. Subsurface stress measurements may be made, for example, with a hydraulic fracturing method through which minimum principal stress magnitude at an isolated wellbore interval can be determined. Of the known approaches and systems for determining mechanical properties and stress states of a subsurface formation, each has certain advantages and disadvantages.

SUMMARY

This disclosure is directed to several alternative designs for, devices of, and methods of using monitoring systems and assessment tools. Although it is noted that monitoring approaches and systems are known, there exists a need for improvement on those approaches and systems.

Accordingly, one illustrative instance of the disclosure may include a method for determining elastic properties of a formation along a wellbore. The method may include initiating application of perturbations to a casing of a length of the wellbore, the perturbations causing a force to be applied to the casing of the length of the wellbore. In the method, a value related to stress applied to the casing along the length of the wellbore based on the force applied to the casing may be determined and a value related to strain resultant from the value related to the stress applied to the casing of the length of the wellbore may be identified. The method may further include determining a value related to an elastic property of a formation extending along the length of the wellbore based on the value related to the stress applied to the casing and the value related to the strain resultant from the stress applied to the casing of the length of the wellbore.

Additionally or alternatively to any of the embodiments above, the initiating application of the perturbations to the casing of a length of the wellbore may include initiating application of the perturbations to the casing of the length of the wellbore from a central lumen of the wellbore.

Additionally or alternatively to any of the embodiments above, the formation extending along the length of the wellbore may extend along an exterior of the casing of the length of the wellbore.

Additionally or alternatively to any of the embodiments above, the formation extending along the length of the wellbore may have a plurality of layers; and determining a value related to the elastic properties for the formation extending along the length of the wellbore may include determining the elastic properties for each layer of the plurality of layers of the formation.

Additionally or alternatively to any of the embodiments above, the method may include receiving values of a parameter measured by a distributed strain sensing system extending along the length of the wellbore.

Additionally or alternatively to any of the embodiments above, identifying the value related to the strain resultant from the stress applied to the casing of the length of the wellbore may include determining the value related to strain resultant from the stress applied to the casing of the length of the wellbore based on received values of the parameter measured by the distributed strain sensing system.

Additionally or alternatively to any of the embodiments above, the initiating application of the perturbations to a casing of a length of the wellbore may comprise initiating application of the perturbations to the casing of the length of the wellbore at a first time, t1, and at a second time, t2; determining the value related to the stress applied to the casing along the length of the wellbore based on the force applied to the casing may comprise determining a value of the stress applied to the casing along the length of the wellbore at the first time, t1, and at the second time, t2; identifying the value related to the strain resultant from the stress applied to the casing of the length of the wellbore may comprise determining a value related to the strain resultant from the stress applied to the casing of the length of the wellbore at the first time, t1, and the second time, t2; and determining the value related to the elastic properties of a formation extending along the length of the wellbore based on the value related to the stress applied to the casing and the value related to the strain resultant from the stress applied to the casing of the length of the wellbore may comprise determining a value related to the elastic properties of the formation extending along the length of the wellbore at the first time, t1, and the second time, t2.

Additionally or alternatively to any of the embodiments above, the method may include determining a change in the value related to the elastic property determined at the first time, t1, and the value related to the elastic property determined at the second time, t2; comparing the change in the value related to the elastic property to a threshold level; and outputting a control action when the change in the value related to the elastic property reaches or goes beyond the threshold level.

Additionally or alternatively to any of the embodiments above, the initiating application of the perturbations to the casing of the length of the wellbore, the determining the value related to the stress applied to the casing along the length of the wellbore, the identifying the value related to the strain resultant from the stress applied to the casing of the length of the wellbore, and determining the value related to the elastic property of the formation extending along the length of the wellbore may be repeated at predetermined intervals.

Additionally or alternatively to any of the embodiments above, the method may include maintaining a database of values related to the elastic property of the formation extending along the length of the wellbore that are determined at each of the predetermined intervals.

Additionally or alternatively to any of the embodiments above, the method may include establishing a value related to a force to be applied by the perturbations to the casing of the length of the wellbore; and wherein the value related to the force may be configured to avoid fracturing of the wellbore and avoid fracturing the formation extending along the length of the wellbore.

Another illustrative instance of the disclosure may include a controller configured to establish an elastic property of a formation extending along an exterior of a casing of a wellbore. The controller may include a processor, an input port in communication with the processor, and memory storing instructions configured to be executed by the processor to cause the processor to: determine a value related to a stress applied to a casing of a length of the wellbore when perturbations are applied to the casing of the length of the wellbore; receive, via the input port, values related to a parameter measured by a distributed strain sensing system while perturbations are applied to the casing of the length of the wellbore; determine a value related to a strain resultant from the stress applied to the casing of the length of the wellbore based on the values related to the parameter measured by the distributed strain sensing system that are received; and determine a value related to an elastic property of a formation extending along the length of the wellbore based on the value related to the stress applied to the casing of the length of the wellbore and the value related to the strain resultant from the stress applied to the casing of the length of the wellbore.

Additionally or alternatively to any of the embodiments above, the memory may further comprise instructions configured to be executed by the processor to cause the processor to establish a value related to a force for perturbations to be applied to the casing of the length of the wellbore.

Additionally or alternatively to any of the embodiments above, the value related to the force may be configured to avoid fracturing of the wellbore and avoid fracturing the formation extending along the length of the wellbore.

Additionally or alternatively to any of the embodiments above, the memory may further comprise instructions configured to be executed by the processor to cause the processor to determine a value related to the elastic property for each layer of a plurality of layers forming the formation extending along the length of the wellbore.

Additionally or alternatively to any of the embodiments above, the memory further comprises instructions configured to be executed by the processor to cause the processor to: repeat at predetermined intervals: the determining the value related to the stress applied to a casing of a length of the wellbore; the receiving, via the input port, the values related to the parameter measured by the distributed strain sensing system; the determining the value related to the strain resultant from the stress applied to the casing of the length of the wellbore; and the determining the value related to an elastic property of a formation extending along the length of the wellbore; and maintain a database of the values related to the elastic property of the formation extending along the length of the wellbore that is determined at each of the predetermined intervals.

Additionally or alternatively to any of the embodiments above, the distributed strain sensing system may include a fiber optic cable extending along the length of the wellbore and the values received from the distributed strain sensing system may be related to one or both of an amount of light and a pattern of light received at a light detector of the distributed strain sensing system.

Another illustrative instance of the disclosure may include a system for establishing elastic properties. The system may comprise a distributed strain sensing system configured to sense a parameter related to strain resultant from a stress applied to a casing of a length of a wellbore and a controller in communication with the distributed strain sensing system, the controller is configured to determine an elastic property of a formation extending along an exterior of the casing of the length of the wellbore based on the values of the parameter measured using the elongated fiber. The distributed strain sensing system may include an elongated fiber configured to extend along the length of the wellbore and a strain sensing controller configured to provide values of a parameter measured using the elongated fiber, the values of the parameter are related to strain resultant from a stress applied to the wellbore.

Additionally or alternatively to any of the embodiments above, the controller is configured to: receive an input of a value related to a stress applied to the casing of the length of the wellbore; and determine the elastic property of the formation extending along the exterior of the casing of the length of the wellbore based on the values of the parameter measured using the elongated fiber and the value related to the stress applied to the casing of the length of the wellbore.

Additionally or alternatively to any of the embodiments above, the controller is configured to: determine a value related to a stress to be applied to the casing of the length of the wellbore; and determine the elastic property of the formation extending along the exterior of the casing of the length of the wellbore based on the values of the parameter measured using the elongated fiber and the value related to the stress to be applied to the casing of the length of the wellbore.

The above summary of some example embodiments is not intended to describe each disclosed embodiment or every implementation of the disclosure.

BRIEF DESCRIPTION OF THE DRAWINGS

The disclosure may be more completely understood in consideration of the following detailed description of various embodiments in connection with the accompanying drawings, in which.

Figure 1:
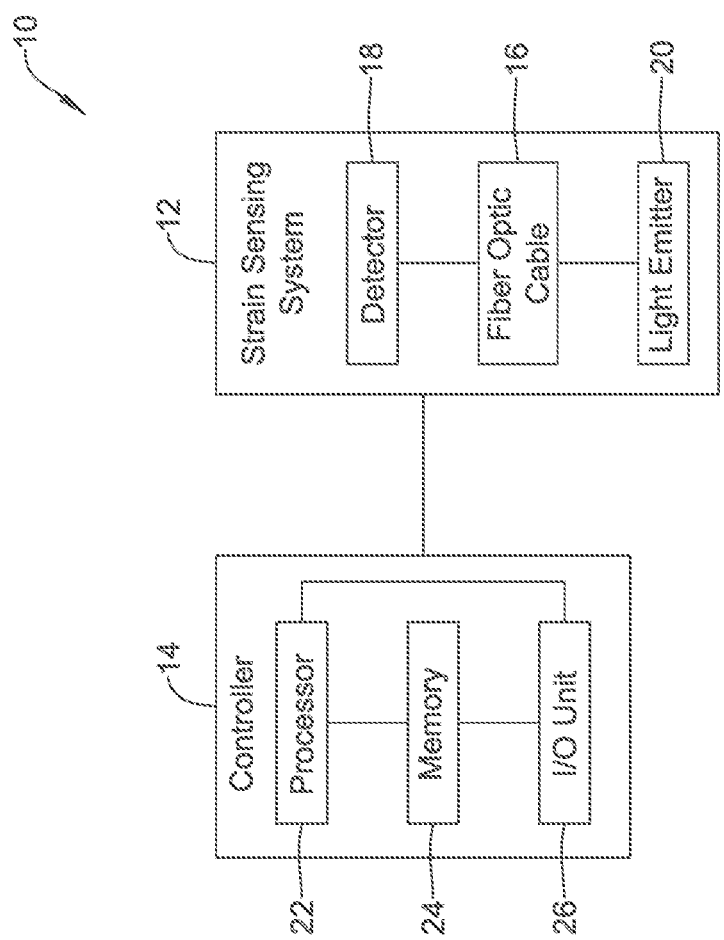
FIG. 1 is a schematic box diagram of an illustrative system for determining mechanical properties of a subsurface formation.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Subsurface stresses impact a number of geologic conditions that are important for a number of commercially relevant systems, including geothermal, oil, and gas systems, among others. Successful implementation of such systems may require accurate information on size, orientation, complexity, and/or other parameters related to natural and anthropogenic fracture systems. For example, knowledge concerning a subsurface state of stress may be useful for geothermal reservoir development such that wellbores and/or engineered fracture systems may be optimized for orientation, spacing, and/or subsequent productivity. Decreasing a cost of exploitation for oil wells, gas wells, geothermal reservoirs, and/or other suitable subsurface systems may be achieved by reducing uncertainty in estimating subsurface stress.

Existing subsurface stress measurements and/or prediction techniques (e.g., existing mechanical property and/or other suitable property or condition determination techniques) may be valid only at discrete points or relatively short sections of wellbores. For example, while hydraulic fracturing techniques may be acceptable for measuring stress at a particular location, it has been found to have at least the following drawbacks: (1) requires an initiation of fractures, which may or may not be beneficial at that location (e.g., creation of additional potential lost circulation zones), and (2) a state of stress is measured at a particular location along a wellbore and only provides singular "calibration" points rather than determination of a continuous log of stress estimation along a length of the wellbore.

The disclosed concepts provide improved methods and systems for continuous measurements of subsurface stresses over large lengths (e.g., entire lengths and/or other suitable large lengths) of wellbores and over large timescales (e.g., throughout the life of the wellbore). The methods and system herein may be utilized for generating a continuous log of stress prediction via perturbations (e.g., wellbore perturbations and/or other suitable perturbations), strain sensing (e.g., fiber optic distributed strain sensing and/or other suitable strain sensing), mechanical property characterization (e.g., anisotropic elastic property characterization and/or other suitable mechanical property characterization), mechanical property validation (e.g., an inversion for elastic property validation), and/or other suitable features.

Mechanical property determination of subsurface formations may facilitate determining how the subsurface formations may fracture and thus, may be used to identify locations of the formations that may fracture according to a desirable profile. In one example, values of a minimum horizontal stress for a formation location, which may be determined or estimated from mechanical properties, may be considered a primary determinant of a shape and size of a fracture and thus, may be utilized to facilitate identifying locations at which fracturing of formations should be initiated.

In some cases, systems and methods that generate a continuous log of stress prediction may utilize an elongated fiber probe permanently placed in a wellbore, where the elongated fiber probe may be used in sensing strain resultant from a stress applied to the wellbore. Strain data obtained through the use of the elongated fiber probe, and/or strain data obtained in one or more other suitable manners may be used to characterize geological mechanical properties and/or other suitable geological properties or conditions, including stress, size, orientation, complexity, and/or other parameters of a subsurface formation around the wellbores and/or reservoirs. From these characterized parameters of the subsurface formation around wellbores and/or reservoirs, subsurface stresses may be determined. An accurate prediction of subsurface stresses may be beneficial when core material (e.g., material removed from the subsurface formation when forming a wellbore) cannot be obtained due to cost or poor recovery of the core material, there are no borehole (e.g., central lumen) image logs, and/or beneficial in other suitable instances.

Turning to the Figures, FIG. 1 discloses a system 10 for determining and/or establishing mechanical properties and/or other suitable properties or conditions of a subsurface formation. In some cases, the system 10 may be configured to establish elastic properties of a subsurface formation extending about or otherwise around a wellbore and/or a reservoir.

The system 10 may include, among other components, a strain sensing system 12 and a controller 14. The strain sensing system 12 may be any suitable type of strain sensing system 12 configured to sense strain along a length of a wellbore. In one example, the strain sensing system 12 may be a fiber optic distributed strain sensing (DSS) system. The controller 14 may be any suitable controller configured to process the data of or from the strain sensing system 12. The controller 14 may be a component that is separate from the strain sensing system 12, as depicted in FIG. 1, and/or the controller 14, or a portion of the controller 14, may be a component of or otherwise included in the strain sensing system 12.

The strain sensing system 12 may include, among other suitable components, a fiber optic cable 16, a detector 18 in communication with the fiber optic cable 16, and a light emitter 20 in communication with the fiber optic cable 16. The detector 18 (e.g., a light detector and/or other suitable type of detector) may be connected to a first end of the fiber optic cable 16 and may be configured to detect light that is reflected back to the first end after interacting with a material (e.g., glass or other suitable material) of a fiber of the fiber optic cable 16.

The fiber optic cable 16 may include one or more optical fiber configured to allow light to travel along each fiber. The light reflected back to the first end of the fiber may be the result of backscatter (e.g., Raman mechanisms, Brillouin mechanisms, Rayleigh mechanisms, and/or other mechanisms). The backscattering of light may be a spontaneous and diffuse reflection.

The detector 18 may be any suitable type of light detector. In some cases, the detector 18 may be configured to detect light that has been reflected to the detector 18 through the fiber optic cable 16. In one example, the detector 18 may be configured to detect an amount of light received at the detector 18, a pattern of light received at the detector 18, a wavelength of light received at the detector 18, and/or one or more other suitable parameters related to light received at the detector 18. Although not required, measurements of the amount, the pattern, the wavelength, and/or other suitable parameters related to light received at the detector 18 may be saved in memory of the strain sensing system 12 and/or other suitable memory.

The light emitter 20 may be any suitable type of light emitter 20 configured to provide light through one or more fibers of the fiber optic cable 16. In some cases, the light emitter 20 may incorporate one or more lasers, one or more light emitting diodes (LEDs), one or more super luminescent light emitting diodes (SLEDs) and/or other suitable light sources configured to send light waves through the one or more fibers of the fiber optic cable 16.

The light emitter 20 may emit a light having a known wavelength. In some cases, the light emitter 20 may emit light at a wavelength within a range of 405 nanometers (nm) and 1580 nm and/or light at one or more other suitable wavelengths In addition to or alternatively to the fiber optic cable 16, the detector 18, and the light emitter 20, the strain sensing system 12 may include one or more other suitable components to facilitate sensing strain along the fiber optic cable 16. In one example, the strain sensing system 12 may include, among other features, one or more processors, memory, an input/output (I/O) unit, communication components, a user interface, a touch screen, a display screen, selectable buttons, a housing, and/or other suitable components configured to facilitate sensing strain along the fiber optic cable 16. In some cases, the detector 18 and/or the light emitter 20 may be or may include computing devices having memory, one or more processors, and/or other suitable components of computing devices.

In some cases, modulations in detected light may be identified by the strain sensing system 12 (e.g., via the detector 18 and/or other suitable computing component of the strain sensing system 12) and/or the controller 14. The identified modulations in detected light may be indicative of a change in strain acting on the fiber optic cable 16 (e.g., a strain acting on a length of the fiber optic cable 16). The identified modulations in reflected light may include, but are not limited to, modulations of amplitude, phase, and/or frequency, which may be identified spatially along a length of the fiber optic cable 16 (e.g., identification of a location of the detected modulations and/or strain change along the fiber optic cable 16). Spatial identification of the identified modulations in reflected light along the fiber optic cable 16 may be determined using optical time domain reflectometry (OTDR), optical frequency domain reflectometry (OFDR), and/or other suitable techniques.

Strain sensing system 12 may be configured to provide a continuous strain profile along a length of the fiber optic cable 16. A spatial resolution of the strain sensing system 12 and/or the continuous strain profile along the length of the fiber optic cable 16 may be determined by a pulse width of the light emitted from the light emitter 20 and a frequency-scanning range of the light emitter. The strain sensing system 12 may be configured to utilize one or more of Rayleigh optical frequency domain reflectometry, Brillouin optical time domain reflectometry, and/or other suitable techniques to identify modulations in reflected light along the fiber optic cable 16 and develop a continuous strain profile along the length of the fiber optic cable 16.

As depicted in FIG. 1, the controller 14 may be in communication with the strain sensing system 12. In some cases, the controller 14 may be configured to receive data from the strain sensing system 12 and determine mechanical properties and/or other suitable properties or conditions (e.g., which may or may not be related to the mechanical properties) of a subsurface formation (e.g., a subsurface formation extending along an exterior (e.g., an exterior surface) of a casing of a length of a wellbore and/or other suitable subsurface formation). Example mechanical properties of subsurface formations include, but are not limited to, elastic properties, elastic moduli, stiffness, compressibilities, effective pressure coefficients, etc. Examples of other suitable properties or conditions of subsurface formations include, but are not limited to, stress gradients, vertical stress, pore pressure, minimum horizontal stress, etc.

Example data the controller 14 may receive from the strain sensing system 12 may include, but is not limited to, values related to strain sensed by the strain sensing system 12, time data associated with the strain sensing system 12, etc. Additionally to or alternatively to receiving data from the strain sensing system 12, the controller 14 may determine a value related to a stress to be applied to a casing of a length of a wellbore and/or receive an input of a value related to a stress applied to the casing of the length of the wellbore. In some cases, the controller 14 may be configured to determine one or more mechanical properties and/or other suitable properties or conditions of the formation extending along an exterior of the casing of the length of the wellbore based on the values related to strain sensed by the strain sensing system 12 and the values related to the stress applied to or to be applied to the casing of the length of the wellbore.

The illustrative controller 14 may include, among other suitable components, one or more processors 22, memory 24, and/or an I/O unit 26. Example other suitable components of the controller 14 that are not depicted in FIG. 1 may include, but are not limited to, communication components, a user interface, a touch screen, a display screen, selectable buttons, a housing, a pump controller for facilitating applying stress to a wellbore, and/or other suitable components of a controller. As discussed above, one or more components of the controller 14 may be separate from the strain sensing system 12, as depicted in FIG. 1, and/or incorporated into the strain sensing system 12.

The processor 22 of the controller 14 may include a single processor or more than one processor working individually or with one another. The processor 22 may be configured to execute instructions, including instructions that may be loaded into the memory 24 and/or other suitable memory. Example components of the processor 22 may include, but are not limited to, microprocessors, microcontrollers, multi-core processors, graphical processing units, digital signal processors, application specific integrated circuits (ASICs), field programmable gate arrays (FPGAs), discrete circuitry, and/or other suitable types of data processing devices.

The memory 24 of the controller 14 may include a single memory component or more than one memory component each working individually or with one another. Example types of memory 24 may include random access memory (RAM), EEPROM, FLASH, suitable volatile storage devices, suitable non-volatile storage devices, persistent memory (e.g., read only memory (ROM), hard drive, Flash memory, optical disc memory, and/or other suitable persistent memory) and/or other suitable types of memory. The memory 24 may be or may include a non-transitory computer readable medium.

The I/O units 26 of the controller 14 may include a single I/O component or more than one I/O component each working individually or with one another. Example I/O units 26 may be or may include any suitable types of communication hardware and/or software including, but not limited to, communication ports configured to communicate with the strain sensing system 12 and/or other suitable computing devices or systems. Example types of I/O units 26 may include wired ports, wireless ports, radio frequency (RF) ports, Low-Energy Bluetooth ports, Bluetooth ports, Near-Field Communication (NFC) ports, HDMI ports, WiFi ports, Ethernet ports, VGA ports, serial ports, parallel ports, component video ports, S-video ports, composite audio/video ports, DVI ports, USB ports, optical ports, and/or other suitable ports.

Figure 2:
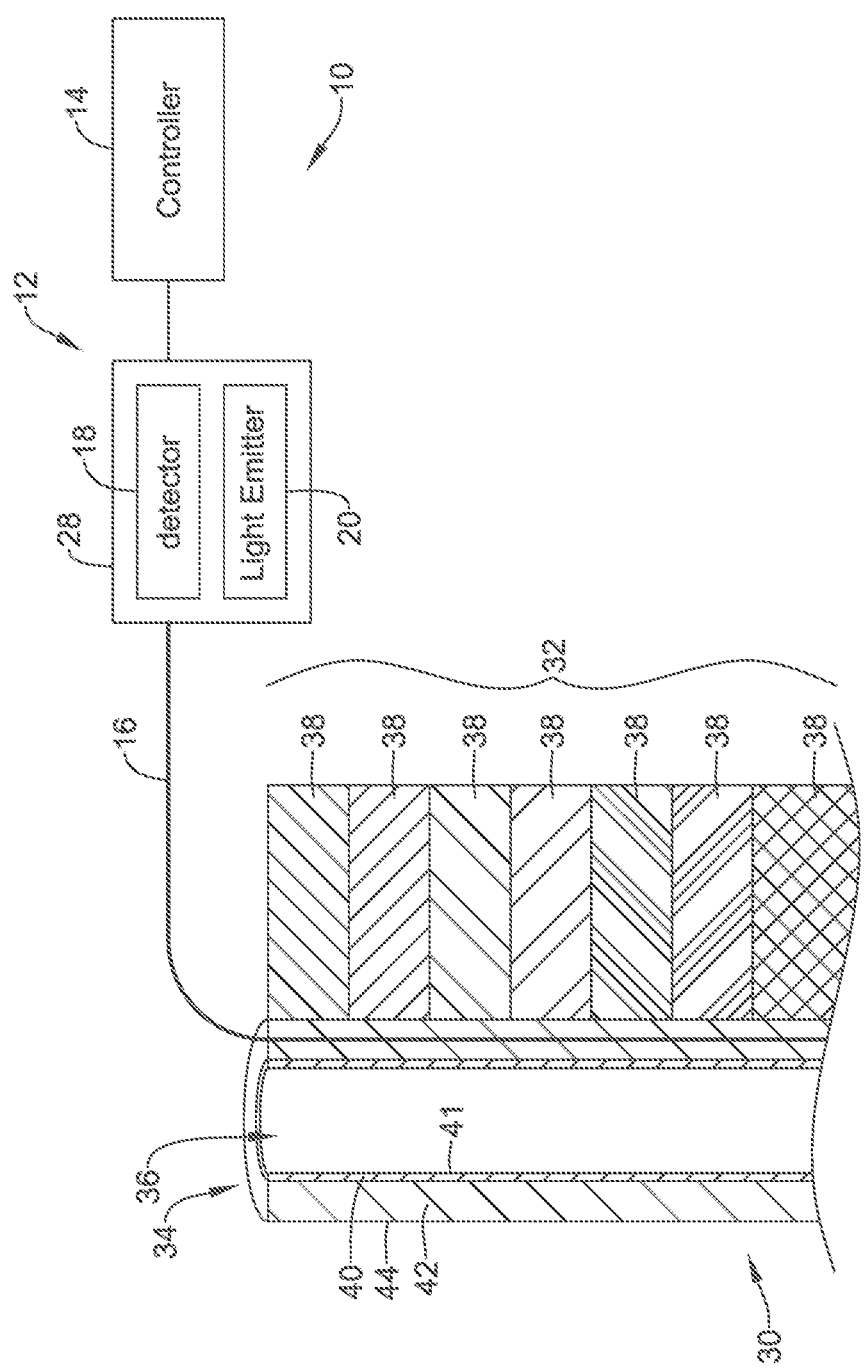
FIG. 2 is a schematic diagram of an illustrative system for determining mechanical properties of a subsurface formation implemented at a wellbore.

FIG. 2 is a schematic partial cross-sectional diagram of the system 10 for determining mechanical properties and/or other suitable properties or conditions of a subsurface formation implemented at a wellbore 30. In FIG. 2, the wellbore 30 and a subsurface formation 32 are depicted in a schematic cross-sectional view, while the strain sensing system 12 and the controller 14 are depicted from a schematic side view.

As depicted in FIG. 2, the strain sensing system 12 may be in communication with the controller 14 and may include a housing 28. The housing 28 may house the fiber optic cable 16, the detector 18, the light emitter 20, and/or additional or alternative components, and the fiber optic cable 16 may extend from the housing 28. Although the housing 28 is depicted in FIG. 2, the housing 28 may be omitted. Further, although the controller 14 is depicted in FIG. 2 as being a component that is separate from the strain sensing system 12, the housing 28 may house an entirety of or part of the controller 14 and/or a housing (not shown) of the controller 14 may house the entirety of or part of the strain sensing system 12.

The subsurface formation 32 may be formed from one or more suitable layers 38 of material. The layers 38 of material forming the subsurface formation 32 may be any suitable type of material and may have any suitable size. In some cases, the subsurface formation 32 may have a single layer 38 of material extending an entire length of the wellbore 30 or two or more layers 38 of material extending along the length of the wellbore 30. Example layers of material include, but are not limited to, sand, topsoil, solid rock (e.g., granite, etc.), stones, clay, water, oil, sandstone, limestone, shale, carbonate, ash, and/or other suitable geologic materials (e.g., metamorphic, sedimentary, and/or igneous rocks/soil).

Each layer 38 of the subsurface formation 32 may be considered to have its own mechanical properties and/or other suitable properties or conditions due to, among other factors, how the layer 38 was formed, when the layer 38 was formed, and/or what materials are in the layer 38. In some cases, two adjacent layers of the same general material may have different mechanical properties and/or other suitable properties or conditions based on how and/or when the layer was formed as well as the constituent makeup of the material. As such, each layer 38 of the subsurface formation 32 may have its own mechanical anisotropy and/or properties when viewed on a layer-scale or a granular/fine scale. In some cases, the layers 38 of the subsurface formation 32 may be intrinsically heterogeneous and/or have anisotropic properties. Further, the overall subsurface formation 32 may have its own mechanical anisotropy and properties that are functions of the all of the layers 38 of the subsurface formation 32.

A type, size, mechanical properties, and/or other suitable properties or conditions of the layers 38 and/or the overall subsurface formation 32 may be determined from subsurface formation core samples extracted when forming the wellbore 30 and/or exploring where to position the wellbore, but sometimes it is not possible to analyze a core sample due to costs, poor recovery of the core sample, and/or due to other suitable reasons. In cases when it is not possible to analyze core samples and/or in other cases, it may be possible to determine type, size, mechanical properties, and/or other suitable properties or conditions of the layers 38 of the subsurface formation 32 and/or the overall subsurface formation 32 with the system 10 via data captured by the strain sensing system 12, as referred to above and discussed in greater detail below.

Wellbores 30 may take on any suitable configuration extending through the subsurface formation 32. In one example, the wellbore 30 may have a casing 34 extending through the subsurface formation 32 and defining a central lumen 36 (e.g., a passageway) for fluid and/or components to pass through the wellbore 30. In some cases, the wellbore 30 may extend through the subsurface formation 32 to one or more subsurface reservoirs (e.g., an oil reservoir, a gas reservoir, geothermal reservoir, etc.), such that fluid may be pumped through central lumen 36 of the wellbore 30 to the reservoir to force fluid from the reservoir, such that fluid may be removed from the reservoir through the central lumen 36 of the wellbore 30 (e.g., removed due to natural pressures in the reservoir pushing the fluid out of the reservoir and/or removed due to pumping fluid of the reservoir), such that a fluid pumped through the central lumen 36 of the wellbore 30 may be heated or cooled by a geothermal reservoir, and/or such that other suitable functions are achieved.

The casing 34 of the wellbore 30 may take on any suitable configuration configured to withstand pressures provided in the central lumen 36. In one example, the casing 34 may be formed from a first layer 40 (e.g., an inner layer) forming an inner surface 41 of the casing 34 and a second layer 42 (e.g., an outer layer) forming an outer surface 44 of the casing 34. In some cases, one or more of the first layer 40 and the second layer 42 may be omitted and/or one or more additional layers may be utilized. Additionally or alternatively, a layer other than second layer 42 may form the outer surface 44 of the casing 34 and/or a layer other than the first layer 40 may form the inner surface of the casing 34.

The first layer 40 and the second layer 42 may be formed from a same or different material as one or more other layers 40, 42 of the casing 34. In one example, the first layer 40 may be formed from a steel material and the second layer 42 may be formed from or with a cement or a concrete material.

As shown in FIG. 2, the fiber optic cable 16 may extend along the wellbore 30 through the casing 34. In the example depicted, the fiber optic cable 16 may extend along the wellbore 30 through the second layer 42 of the casing 34, but this is not required. When the second layer 42 of the casing 34 is a curable material (e.g., a cement or concrete based material or other suitable curable material), the fiber optic cable 16 may be placed along the first layer 40 and then the second layer 42 may be provided along the first layer 40 and cured or allowed to set to secure the fiber optic cable 16 within the casing 34. When so positioned and/or otherwise positioned along a length of the wellbore 30, the fiber optic cable 16 may act as a sensor and sense a strain resultant from a stress applied to the casing of a length of the wellbore 30.

In some cases, a stress may be applied to the casing 34 of a length of the wellbore 30 from within the central lumen 36 and the fiber optic cable 16 of the strain sensing system 12 may be configured to sense a strain or a change in strain in response to the stress applied to the casing 34. The stress may be applied to the casing 34 of the length of the wellbore 30 in any suitable manner. In some cases, packers typically utilized for fracturing a subsurface location may be utilized to apply a stress to the casing 34, but in a manner that does not cause fracturing of the wellbore 30 and/or the subsurface formation 32 around the wellbore 30.

Figure 3:
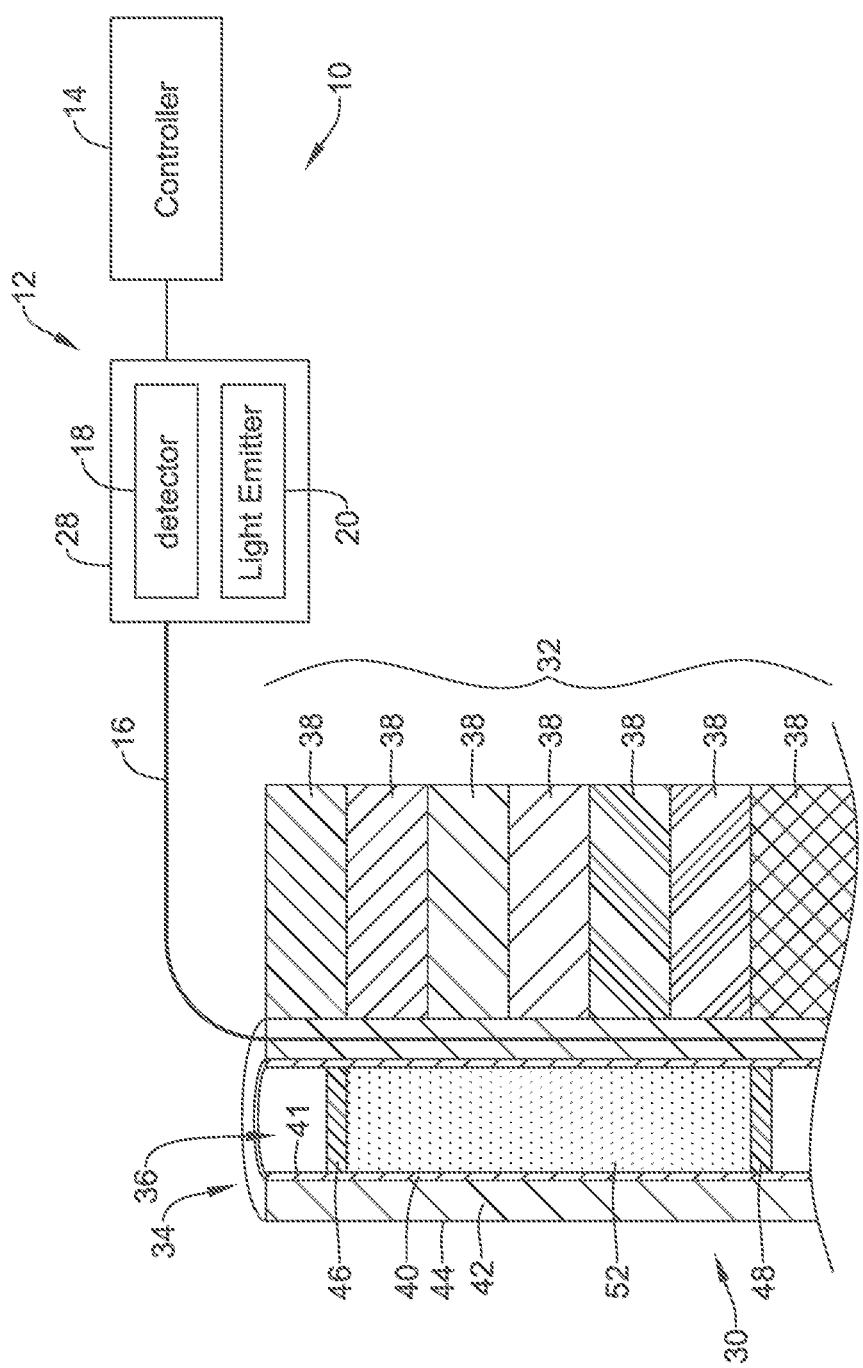
FIG. 3 is a schematic diagram of an illustrative system for determining mechanical properties of a subsurface formation implemented at a wellbore with packers therein and fluid between the packers.
Figure 4:
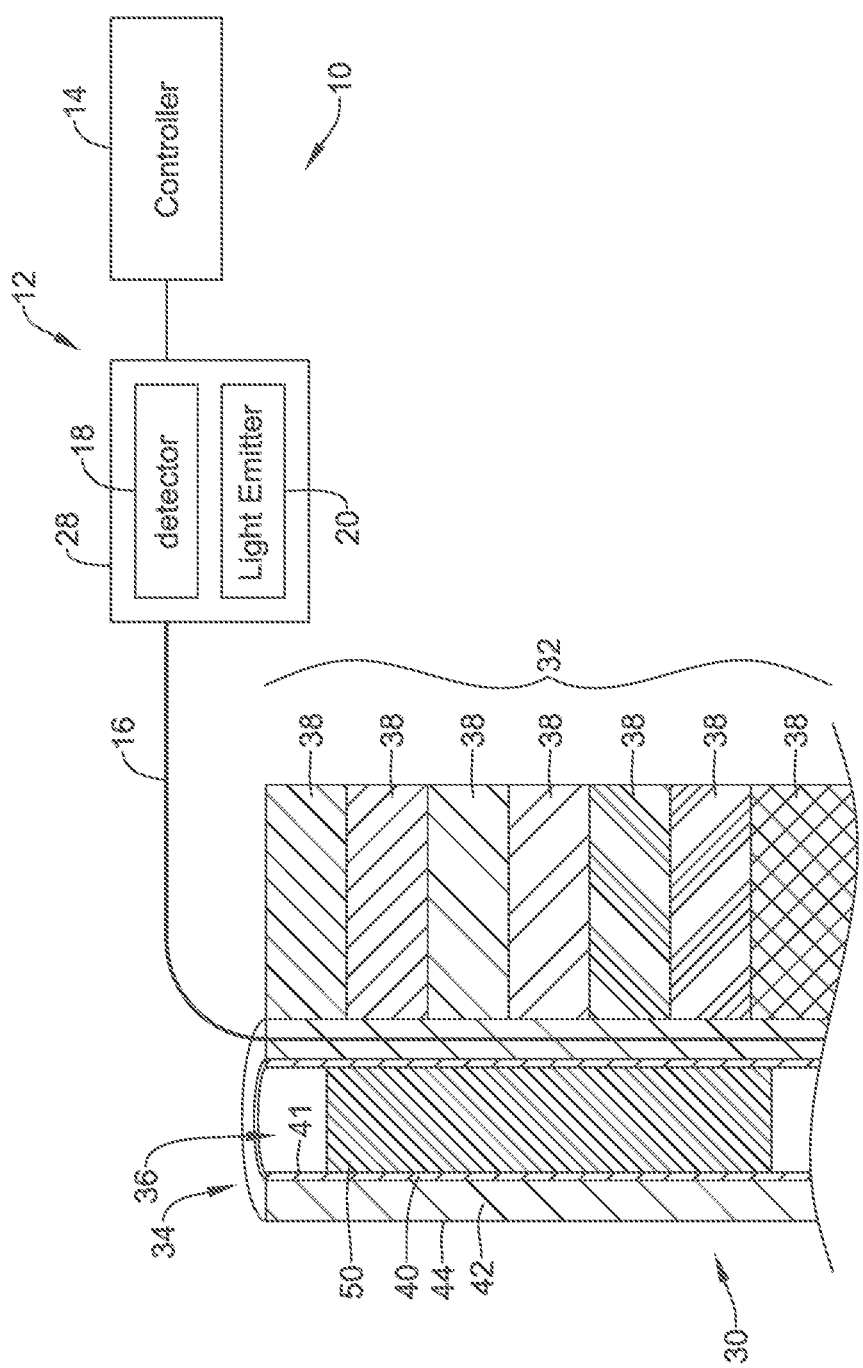
FIG. 4 is a schematic diagram of an illustrative system for determining mechanical properties of a subsurface formation implemented at a wellbore with a packer therein.

FIGS. 3 and 4 depict schematic diagrams of the system 10 sensing strain along the casing 34 of the wellbore 30 in response to perturbations applied to the wellbore 30 by stress-inducing systems. FIG. 3 depicts a technique for applying perturbations to the wellbore that utilizes a zonal isolation system with a first packer 46 and a second packer 48 spaced distally from the first packer 46 and a fluid 52 (e.g., the fluid 52 may be a single fluid type or formed from two or more fluid types) located between the first packer 46 and the second packer 48. FIG. 4 depicts a technique for applying perturbations to the wellbore that utilizes an elongated packer 50. Although configurations of stress-inducing systems are depicted in FIG. 3 and FIG. 4, other suitable stress-inducing systems are contemplated. The packers 46, 48, 50 may be inflatable to secure the packers at a desired location in the central lumen 36 and may be inflated by pumping a fluid into the packers with a pumping system (not shown, but which may be part of the stress-inducing system).

In the configuration of FIG. 3, perturbations may be applied to the casing 34 of the wellbore 30 by a stress-inducing system that operates through inflating the first packer 46 at a first location along the wellbore 30 and the second packer 48 at a second location along the wellbore to define a volume along a length of the wellbore between the first packer 46 and the second packer 48. The fluid 52 may be provided to the volume between the first packer 46 and the second packer 48 (at least after the distal packer is inflated and positioned in the wellbore 30), such that the fluid 52 may be confined between the first packer 46 and the second packer 48. The fluid may be added to the volume between the first packer 46 and the second packer 48 such that a desired radially outward pressure or stress (e.g., a fluid pressure) may be applied to a casing 34 of a length of the wellbore 30 from within the central lumen 36 to apply stress perturbations to the casing 34 and the subsurface formation 32 along the casing 34. In some cases, the fluid 52 may be added to the volume between the first packer 46 and the second packer 48 with a suitable pump system (e.g., a surface pump or other suitable pump, not shown) and/or other suitable fluid movement system.

The stress perturbations applied to the casing 34 and the subsurface formation 32 along the casing 34 may be the result of an increase in volume of the fluid 52 between the first packer 46 and the second packer 48. Although increasing a volume of the fluid 52 between the first packer 46 and the second packer 48 by pumping the fluid 52 into the space between the first packer 46 and second packer 48 may be one technique for applying stress perturbations to the casing 34 and the subsurface formation 32 along the casing 34, there may be one or more additional or alternative techniques for applying the stress perturbations. For example, the stress perturbations may be applied to the casing 34 and the subsurface formation 32 along the casing 34 via use of drastic temperature variations of fluid pumped into the wellbore, use of chemical reactions of fluids with multiple components that cause a rapid gas expansion within the wellbore, and/or use of other techniques that may be configured to increase the volume of fluid 52 (e.g., increase the radially outward pressures) between the first packer 46 and the second packer 48.

In the configuration of FIG. 4, perturbations may be applied to the casing 34 of the wellbore 30 by a stress-inducing system that operates through inflation of the elongated packer 50. The elongated packer 50 may be inflated at a location along the wellbore 30 at which it may be desired to apply stress to the casing 34 of the wellbore 30. Further, the elongated packer 50 may be inflated to a level that is configured to apply a desired outward pressure or stress to the casing 34 of a length of the wellbore 30 from within the central lumen 36.

Any suitable measure of stress and/or pressure may be applied to the casing 34 by stress-inducing systems such that the strain sensing system 12 may able to detect or otherwise identify a value related to a strain resultant from the stress/pressure applied to the casing 34. In some cases, the stress/pressure applied to the casing 34 of the wellbore 30 may be high enough to result in a detectable strain, but may be kept below a pressure that may cause fracture of the wellbore 30 and/or the subsurface formation 32. In one example of determining an amount of pressure or stress to apply to the casing 34, the packers 46, 48, 50 may be relatively slowly inflated and/or fluid may be relatively slowly added (e.g., increased or added in iterations) until a first change in strain is sensed by the strain sensing system 12 so as to avoid unnecessary fracturing of the wellbore 30 and/or adjacent subsurface formations. To assist in determining mechanical properties and/or other suitable properties or conditions, the controller 14 and/or other computing devices or a user may record one or more of a pressure and/or stress at which a strain or change in strain was sensed by the strain sensing system 12, a rate of pressurization up to the pressure and/or stress that caused the sensed strain, a time history of the pauses and cycles of applying pressures and/or stresses to the casing 34 of the wellbore 30, and/or other suitable measures related to applying pressures and/or stresses to the casing 34 of the wellbore 30.

Figure 5:
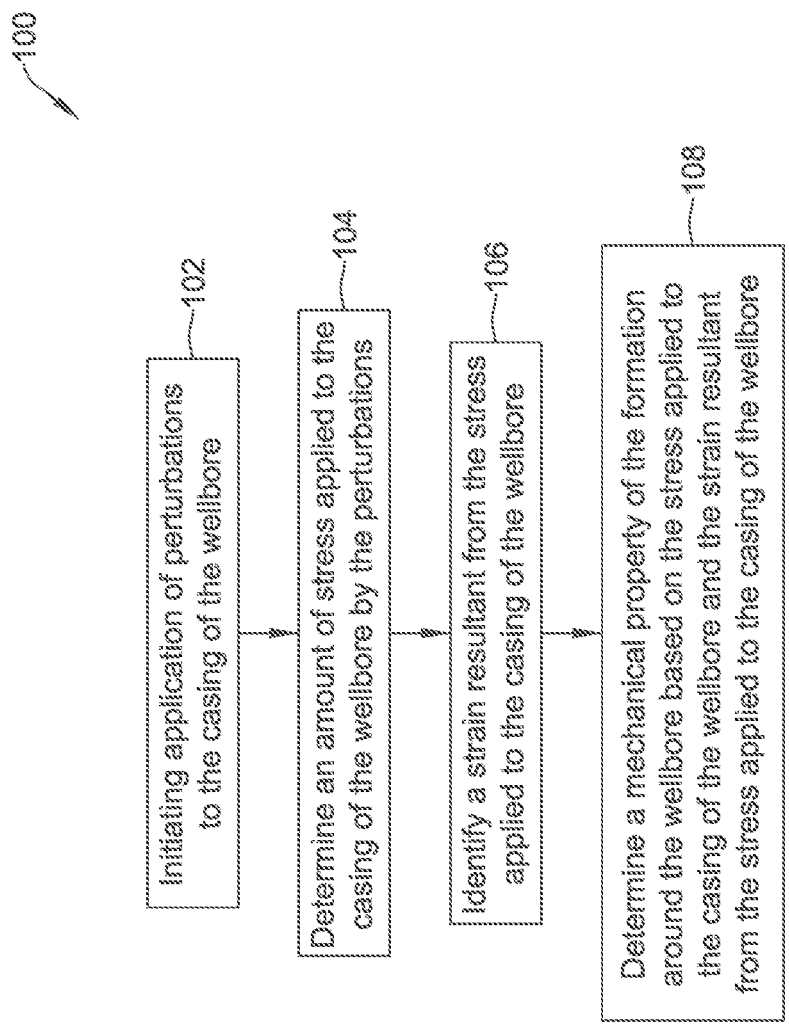
FIG. 5 is a schematic flow diagram of an illustrative method for determining mechanical properties of a subsurface formation.

FIG. 5 depicts a schematic flow diagram of a method 100 for determining mechanical properties of a formation (e.g., the subsurface formation 32 and/or other suitable formations) along a wellbore (e.g., the wellbore 30 and/or other suitable wellbores). In some cases, the method 100 may be used to generate a continuous log of stress prediction around the wellbore and/or may be used for other suitable purposes. Although the method 100 may include various features, as depicted in FIG. 5, the method 100 may include one or more additional or alternative features, as desired. Further, instructions for executing the features of the method 100 may be stored in a non-transitory state in memory (e.g., in computer readable media such as the memory 24 and/or other suitable memory) for execution by a processor (e.g., the processor 22 and/or other suitable processor).

Mechanical properties of the formation along a wellbore may be estimated or determined using systems similar to or different than those depicted in FIGS. 3 and 4. Example systems utilized to determine mechanical properties of the formation along the wellbore may include, but are not limited to, one or more packers (e.g., the packers 46, 48, 50 and/or other suitable packers) to apply a stress to a casing (e.g., the casing 34 and/or other suitable casing) of the wellbore, a strain sensing system (e.g., the strain sensing system 12 and/or other suitable strain sensing system) configured to determine strain in or otherwise along the casing of the wellbore in response to stress applied to the casing, and a controller (e.g., the controller 14 and/or other suitable controller) in communication with the strain sensing system and/or a system configured to apply stress to the casing.

The method 100 may include initiating 102 an application of perturbations to a casing at one or more locations along a length of the wellbore. The perturbations may cause a force to be applied to the casing of the length of the wellbore. When using a setup similar to those depicted in FIGS. 3 and 4, perturbations may be applied to the casing with the use of packers as a result of inflating the packer(s) and/or as a result of inserting a fluid between two or more packers via a pump or other fluid moving mechanism. It is contemplated that stress may be applied to the casing of the wellbore at one or more known locations in one or more other suitable manners. Further, as discussed above, an amount of stress applied to the casing may be kept below a fracture-causing level.

Based on the perturbations applied to or to be applied to the casing, a measure of or a value related to an amount of stress applied to the casing of the wellbore by the perturbations may be determined 104. The determination of an amount of stress applied to the casing of the wellbore may be based on the following equation:

$$\sigma = F/A \tag{1}$$

where, F is an amount of force applied to a surface and A is an amount of surface area to which the force is applied. When utilizing packers to apply a radially outward stress to a casing of wellbore, as depicted in FIGS. 3 and 4 and/or in other suitable instances, the force may be pressure applied to the casing and the area may be the surface area at which the packers apply the force and/or at which the fluid between packers apply the force.

Any suitable amount of radially outward stress may be applied to casing of the wellbore that may facilitate identifying mechanical properties of a formation along an exterior or exterior surface of the casing of the wellbore. In an example, the suitable amount of stress applied may be stress that is great enough to cause detectable strain in or along the casing, yet low enough so as not to cause cracking or fracture of the wellbore and/or surrounding formations. In some cases, a controller (e.g., the controller 14 and/or other suitable controller) may determine an amount of stress to apply to the casing, but this is not required.

Strain may be sensed along a length of the wellbore and a measure of or value related to strain resultant from the stress applied to the casing of a length of the wellbore may be identified 106. When using the strain sensing system discussed with respect to FIGS. 1, 3, and 4, the measure of or the value related to strain may be sensed using a fiber optic cable (e.g., the fiber optic cable 16 and/or other suitable fiber optic cables). The measure of or the value related to strain may be identified based on values of a parameter measured using the fiber optic cable and received at a detector (e.g., the detector 18 and/or other suitable detector) and/or a controller (e.g., the controller 14 and/or other suitable controller). In one example, values of the parameter may be related to an amount and/or a pattern of light reflected to and/or identified by the detector of the strain sensing system. Additionally or alternatively, other strain sensing systems may be utilized to sense strain along the length of the wellbore.

In some cases, a stress/strain log or database may be established and saved in memory (e.g., the memory 24 of the controller 14 and/or other suitable memory). The stress/strain log or database may include an entry for a value related to (e.g., a value of or otherwise a value of a function of) an amount of force applied to the casing, a surface area at which force was applied to the casing, a value related to an amount of stress applied to the casing, a rate at which the stress was applied to the casing, a location at which the stress was applied to the casing, a date and time at which the stress is applied to the casing, a value related to sensed strain along the length of the wellbore at which stress was applied to the casing, and/or one or more other suitable entries.

Based on the determined value related to the stress applied to the casing of the wellbore and the identified value related to the strain resultant from the value related to the stress applied to the casing of the length of the wellbore, a value related to a mechanical property of the formation extending along the length of the wellbore may be determined 108. In some cases, the mechanical property of the formation for which the value is determined may be one or more elastic properties, elastic moduli, stress gradients, vertical stress, pore pressure, minimum horizontal stress, and/or one or more other suitable mechanical properties.

In some cases, the value related to the mechanical property of the formation may be determined, at least in part, based on Hooke's law. Hooke's law states that strain in a solid is proportional to the applied stresses within an elastic limit of that solid and may be generally represented as follows:

$$\sigma = (C)(\varepsilon) \tag{2}$$

where, $\sigma$ represents an amount of stress applied to a solid, $\varepsilon$ represents an amount of strain in the solid in response to the amount of stress applied to the solid, and C represents a stiffness of the solid, where the stiffness may be a function of one or more elastic constants and/or other suitable mechanical properties determined based on the type(s) of material of the solid.

Once determined, the value related to the mechanical property of the formation extending along the wellbore may be added to the stress/strain log or database, if one or more are maintained. In some cases, features 102, 104, 106, and 108 of the method 100 may be repeated at various locations along the length of the wellbore and/or overtime (e.g., at predetermined time intervals and/or at other suitable times) to facilitate identifying mechanical properties of the formation along the length of the wellbore and/or to facilitate determining how the mechanical properties of the formation along the wellbore change over time.

Using the general form of equation (2), the stiffness, other suitable mechanical properties, and/or other suitable properties or conditions of the formation extending along the wellbore may be determined based on the applied stress and the sensed strain in response to the applied stress. For example and assuming a tight fit between the casing of the wellbore and the formation along the wellbore, the value related to the stiffness of the formation may be a function of the mechanical properties of the casing and the mechanical properties of the formation extending along the wellbore, and if the mechanical properties of the casing are known (e.g., as the material of the casing are typically well-defined materials having known mechanical properties), the mechanical properties (e.g., a stiffness and/or other suitable mechanical properties) of the formation extending along the wellbore may be determined.

In some instances, the value related to the mechanical property of the formation may be compared to a threshold level (e.g., a threshold value) and one or more control actions and/or other suitable decisions may be made based on the comparison (e.g., based on determining whether the value related to the mechanical property has reached or gone beyond the threshold level). In one example, the control signal may be provided to highlight or mark a location along the wellbore at which it may be desirable to initiate fracture of the formation extending along the wellbore. Other suitable control signals are contemplated.

In some cases, the perturbations applied to the casing of the length of the wellbore may be initiated at a first time, t1, and at a second time, t2. When the perturbations are applied to the casing of the wellbore at or about the first time, t1, and at the second time, t2, a value of the stress applied to the casing along the length of the wellbore at the first time, t1, and at the second time, t2, may be determined. Similarly, a value related to the strain resultant from the stress applied to the casing of the length of the wellbore at the first time, t1, and at the second time, t2, may be determined. Then, a value related to the mechanical property of the formation extending along the length of the wellbore may be determined at the first time, t1, and the second time, t2. In some instances, a change in the value related to the mechanical property of the formation from the value determined at the first time, t1, to the value determined at the second time, t2, may be identified or determined. The change in the value related to the mechanical property may be compared to the threshold level (e.g., a threshold value) and a control action may be output when the change in the value related to elastic property reaches or goes beyond the threshold level.

Figure 6:
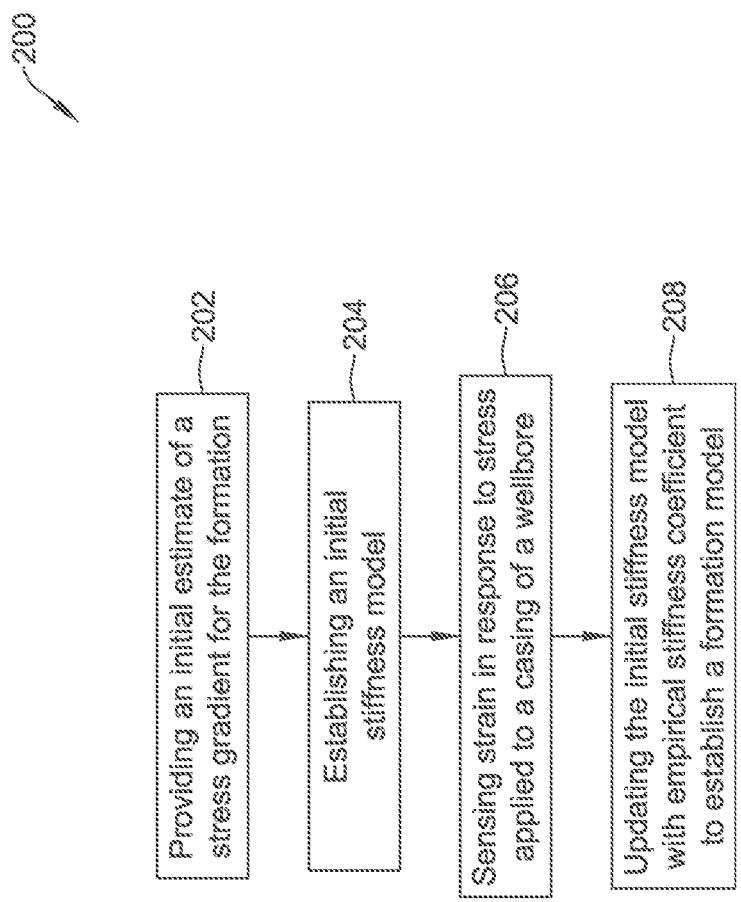
FIG. 6 is a schematic flow diagram of an illustrative method for developing a stiffness model of a subsurface formation.

FIG. 6 depicts a schematic flow diagram of a method 200 of establishing a model of the mechanical properties of a formation (e.g., the subsurface formation 32 and/or other suitable formations) extending along a wellbore (e.g., the wellbore 30 and/or other suitable wellbores). Example models of the mechanical properties of a formation (e.g., the subsurface formation extending along the wellbore) may include a model of the mechanical properties of the formation along an entire length of the wellbore and/or models of the mechanical properties across one or more sub-lengths of the length of the wellbore.

Although the method 200 may include various features, as depicted in FIG. 6, the method 200 may include one or more additional or alternative features, as desired. Further, although the features of the method 200 may be described in an order and depicted in an order in FIG. 6, one or more of the features of the method 200 may be performed in one or more other suitable orders. Further, instructions for executing the features of the method 200 may be stored in a non-transitory state in memory (e.g., in computer readable memory such as the memory 24 and/or other suitable memory) for execution by a processor (e.g., the processor 22 and/or other suitable processor).

The method 200 may include determining or providing 202 an initial estimate for a stress gradient or stiffness of the material of the formation extending along or around the wellbore. This feature is optional and it may be possible to establish a model of the mechanical properties of a formation without providing 202 an initial estimate for the stress gradient or stiffness of the material of the formation. Further, although the initial estimate for a stiffness or stress gradient may be calculated and useful when establishing one or more models of mechanical properties for the formation, initial estimates of the stress gradient or stiffness may be linear gradients or sectioned by a section linear gradient, meaning the initial estimates may be coarse and may not account for variability of mechanical properties and/or stress at individual materials or at individual locations along the formation.

The stress gradient or stiffness of the formation may be determined based on known values related to subsurface material assumed to be present in the subsurface formation along the wellbore. Alternatively, or additionally, a more detailed estimation of the stress gradient or stiffness of the material forming the wellbore may be determined based on data acquired from diagnostic fracture injection tests (DFIT), minifrac tests, and/or other suitable testing or known quantities.

An example of determining the stress gradient or stiffness of the formation based on known values of subsurface material assumed to be present in the formation may utilize values of one or more parameters (e.g., mechanical properties and/or other suitable properties or conditions) of the materials forming the formation. Example parameters include, but are not limited to, vertical stress, pore pressure, minimum horizontal stress, etc. In some cases, lithology of a vertical section (e.g., a thickness and average density of the vertical section) of the formation may be utilized to determine a vertical stress at one or more depths of the formation (e.g., at one or more locations along the length of the wellbore). Pore pressure may be estimated based on well testing. Minimum horizontal stress may be estimated from existing field data in a region data from DFIT or well testing. In one example of determining the stress gradient or stiffness of a formation for a subsurface formation in west Texas, pore pressure may equal 0.45 psi/ft, vertical stress may equal 1.08 psi/ft, and a minimum horizontal stress may equal 0.7 psi/ft. In this example, the stiffness or stress gradient (e.g., minimum effective stress) may be 0.38 psi/ft.

The method 200 may include establishing 204 an initial stiffness or elastic model of the formation around the wellbore that may describe the mechanical properties and anisotropy of the materials assumed to form the formation. The material of the layers of the formation may be any suitable types of material, as discussed above, having one or more different or similar mechanical properties. In some cases the mechanical properties of the material may include homogeneous and isotropic properties that may be represented by two elastic constants (e.g., Young's moduli and Poisson's ratio), may include transverse isotropic properties having five different elastic constants, may include orthotropic properties, etc.

The stiffness or elastic model of the formation may be based on Hooke's law, as discussed above. An initial mechanical model (e.g., stiffness or elastic model) of a formation around the wellbore having multiple layers may take on the following form (transverse isotropy):

$$\begin{bmatrix} \sigma_{11} \\ \sigma_{22} \\ \sigma_{33} \\ \sigma_{23} \\ \sigma_{31} \\ \sigma_{21} \end{bmatrix} = \begin{bmatrix} C_{11} & C_{12} & C_{13} & 0 & 0 & 0 \\ C_{12} & C_{22} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{bmatrix} \cdot \begin{bmatrix} \varepsilon_{11} \\ \varepsilon_{22} \\ \varepsilon_{33} \\ 2\varepsilon_{23} \\ 2\varepsilon_{31} \\ 2\varepsilon_{21} \end{bmatrix} \quad (3)$$

$\sigma$ is stress, C is stiffness (e.g., a stress gradient), $\varepsilon$ is strain, and the subscripts on the stress $\sigma$ and strain $\varepsilon$ represent a coordinate system (e.g., orientation axes), where "3" may be a direction or axis perpendicular to a plane of bedding or layer of subsurface and "1" and "2" represent directions or axes in the plane of bedding or layer of subsurface The stiffness C may be a function of the elastic constants (e.g., mechanical properties) of the material(s) of the formation around the wellbore. In an example of an initial model of the mechanical properties of formation, the initial estimate of the stress gradient for the formation (e.g., initial estimates of the stress gradient for the formation as a whole or initial estimates of the stress gradient by layer of the formation), when provided, may be used as the stiffness C (or stiffness $C_{ij}$).

The stress $\sigma$ may be a combination of one or more naturally occurring stresses and/or human-applied stresses. In one example, stress $\sigma$ applied to the formation along the wellbore may include human-applied stress applied to the casing of the wellbore at one or more locations along a length of the wellbore (e.g., perturbations applied via packers, packers and pressurized fluid, and/or other suitable stress applying techniques), known stress of any overburdened material of the formation, tectonic stresses, etc.

The strain $\varepsilon$ may be sensed in one or more manners and may be assumed to follow known or predictable deformations. The strain $\varepsilon$ may be a combination of (e.g. a function of) strain resulting from stress applied to the casing of the wellbore that has been sensed in one or more directions. If the strain is elastic, values related to the strain may follow known deformation profiles for a circular cavity. If the strain inelastic, values related to the strain may be determined using fracture mechanics.

The method 200 may include sensing 206 a strain along a length of the wellbore that may occur in response to a stress applied to a casing (e.g., the casing 34 and/or one or more other suitable casings) of the wellbore. In some cases, sensing the strain along the length of the wellbore may include identifying a value related to a strain resultant from the stress applied to the casing.

The strain may be sensed using any suitable strain sensing system (e.g., the strain sensing system 12 and/or other suitable strain sensing system). In some cases, strain resultant from the stress applied to the casing may be sensed in a manner similar to how the strain resultant from the stress applied to the casing may be identified as discussed with respect to the method 100 and FIGS. 1, 3, and 4.

The stress may be applied to the casing of the wellbore in a radially outward manner from a central lumen (e.g., the central lumen 36 and/or other suitable central lumen) defined by the wellbore in a manner similar to how the stress may be applied to the casing as discussed with respect to the method 100 and FIGS. 3 and 4. Alternatively or additionally, the stress may be applied to the casing in one or more other suitable manners.

Once the strain resulting from stress applied to the casing has been sensed, an empirical stiffness or stress gradient (e.g., a stiffness coefficient) may be determined based on the stress applied to the casing and the sensed strain using Hooke's law. Once the empirical stress gradient has been determined for the location or length of the wellbore at which the stress was applied to the casing of the wellbore, the initial estimate of the stress gradient may be updated to facilitate determining a formation stress gradient and the formation stress gradient may be used to update 208 the initial stiffness model to determine an empirically developed formation model of the mechanical properties of materials forming the formation along the wellbore.

In some cases, the steps 206 and 208 may be repeated for each location and/or length at which stress is applied for the casing. When this occurs, not only may formation stress gradients and the formation models be established for each location, but a formation stress gradient and an overall formation model for the formation along an entire length of the wellbore may be established. For example, the formation stress gradient for the formation along the entire length of the wellbore may be a function of the formation stress gradients at individual locations of the formation adjacent to intersection points of where stress applied to the casing intersects with resolution points of the strain sensing system. Alternatively or additionally, the formation stress gradient and/or the formation model at particular locations may interpolated or extrapolated to form the formation stress gradient and the formation model for the formation along the entire length of the wellbore, even at resolutions then a resolution of the strain sensing system, as discussed below.

Figure 7:
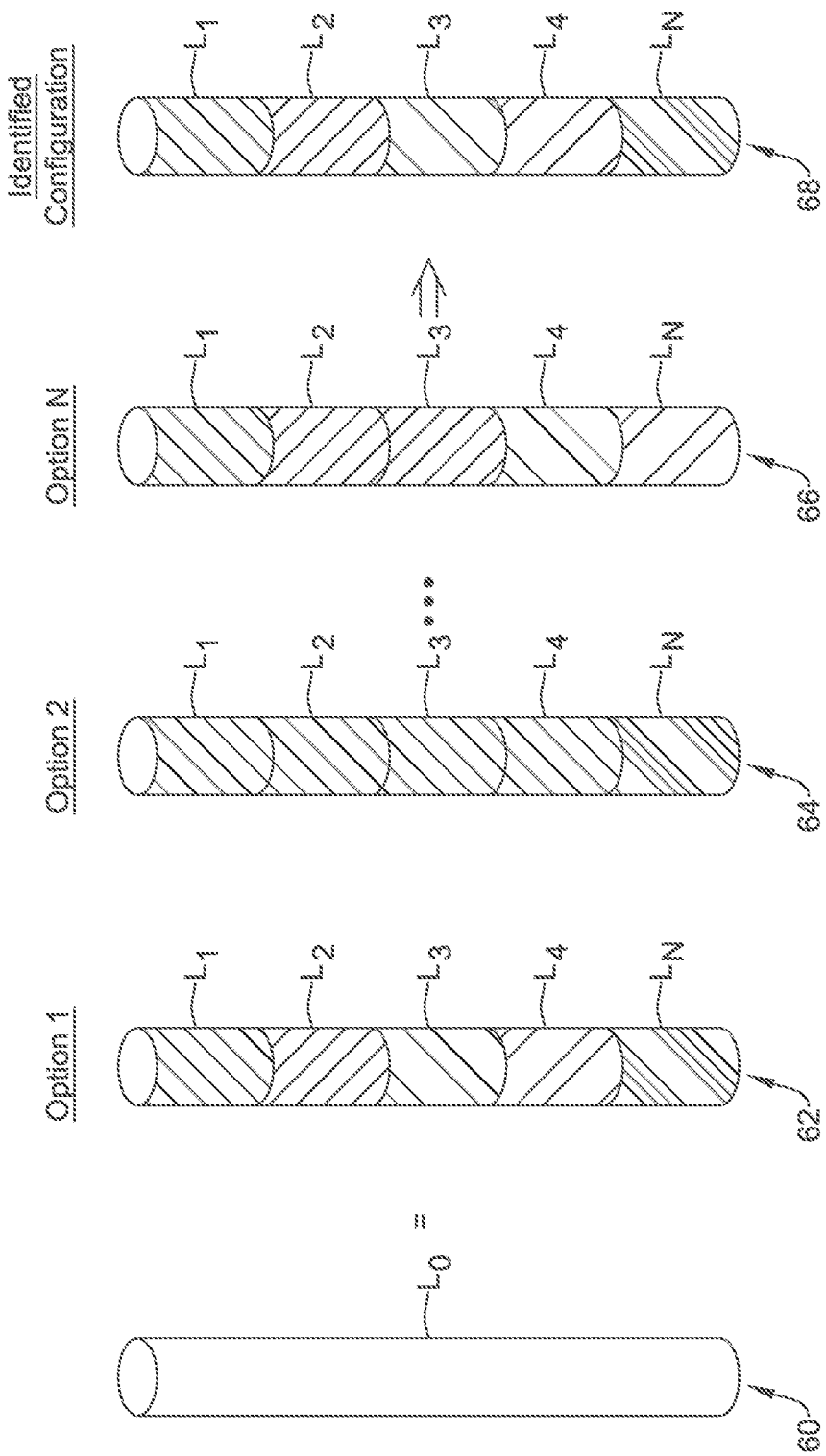
FIG. 7 is a schematic diagram of an illustrative technique for identifying stress states of a subsurface formation along a wellbore.

Once a formation model (e.g., for one or more locations along the wellbore and/or for an entire length of the wellbore) has been developed for a formation along a length (e.g., an entire length or a length of a portion) of the wellbore, the formation model may be utilized to determine formation models (e.g., physical properties and/or physical characteristics) for materials of the subsurface formation at sub-lengths of the length of the wellbore. In one example, a length of a portion the wellbore may be a three-foot section of the wellbore and formation models may be determined for sub-lengths of a subsurface formation long the three-foot section of the wellbore (e.g., formation models may be determined for subsurface formations on a fine scale, where a fine scale may be a scale or lengths smaller than the resolution of strain sensing system). FIG. 7 depicts a schematic illustration of using a formation model for a length of a formation along a wellbore to determine a configuration of the formation, a number of layers (e.g., sub-lengths) of the formation, a location of the layers of the formation, a material type of layers of the formation, a formation model for layers of the formation, and/or other suitable information concerning the formation along sub-lengths of the wellbore.

As depicted in FIG. 7, a first pillar 60 having one sub-length $L_0$ may represent a formation model (or at least a stiffness gradient) of the formation along a length of wellbore. A second pillar 62, a third pillar 64, and an Nth pillar 66 may represent potential configurations of the formation, where each of the second pillar 62, the third pillar 64, and the Nth pillar 66 may have any suitable number of sub-lengths. In the example of FIG. 7, each of the second pillar 62, the third pillar 64, and the Nth pillar 66 may have a first sub-length $L_1$, a second sub-length $L_2$, a third sub-length $L_3$, a fourth sub-length $L_4$, and an Nth sub-length $L_N$. A solution pillar 68 may be selected from the N pillars and may represent a most-likely configuration of the formation along the length of the wellbore broken down into formation models of the formation at each of N sub-lengths of the length of the wellbore.

The second pillar 62 may indicate that the formation along each sub-length of the wellbore may have a different sub-length formation model, as indicated by the different markings (e.g., hatching) in each sub-length. Third pillar 64 and the Nth Pillar 66 may indicate that a same formation model may be utilized to describe the formation along two or more sub-lengths of the wellbore (e.g., four (4) sub-lengths in the third pillar 64 and two sub-lengths in the Nth pillar 66), as indicated by a sub-length having similar markings to markings in one or more other sub-lengths. Different layers of the subsurface formation may be identified when adjacent sub-lengths are described by different formation models.

There may be any suitable number of configurations of the formation, which may be based on a number of possible material types (e.g., the types of materials known to be in or around the formation along the wellbore), a number of sub-lengths (e.g., which may be defined by a resolution of the strain sensing system, a known or estimated number of layers in a length of the formation, etc.), and/or based on other suitable parameters. In one example, when it may be known that the formation along the length of the wellbore may be broken into five sub-lengths and it may be known that there are eight possible material types, there may be 32,768 possible combination of material types for those five sub-lengths. As such, when the length of the wellbore may be a three-foot section of the wellbore, there be 32,768 possible combination of material types for the five sub-lengths of the three-foot section. Although the example using a three-foot length of the wellbore provides an example of determining material types on the fine-scale, similar concepts may be used to determine material types and/or physical properties or characteristics on other scales.

The solution pillar 68 may be identified as the most likely configuration of the subsurface formation based on statistical analysis of the overall formation model (e.g., a formation model for the subsurface formation along the entire length of the wellbore as opposed to a formation model for a portion of the subsurface formation along only a sub-length of the wellbore) with respect to formation models associated with the possible formation configurations. For example, if it is known what types of sub-surface materials (e.g., rock, etc.) may make up the formation and if mechanical properties of those types of materials are generally known, it may be determined which combination of the material types and where those material types are most-likely located to form the formation along the length of the wellbore so as to produce the overall formation model.

Such techniques may be utilized to determine where along the length of the wellbore layers of a subsurface change material type, change formation type (e.g., how the material was formed at that location including, but not limited to, via heat, via flood, etc.), change mechanical properties, etc. Further, in some cases and as referred to above, it may be possible to apply these techniques on a fine-scale, where the length along the wellbore is a length of the resolution of the strain sensing system (e.g., one meter, three feet and/or one or more other suitable resolutions), to determine mechanical properties of materials, material types, layer locations, etc. at different locations of the formation that differ in location by less than the resolution of the strain sensing system. For example, where the resolution of the strain sensing system is one (1) meter, mechanical properties of a formation on the fine-scale may be established for locations along the wellbore that are between a first meter and a second meter of the wellbore, between the second meter and a third meter of the wellbore, etc.

Once the formation model for material of the subsurface formation has been developed based on empirical data and various stiffness or stress gradients $C_{ij}$ are known, the formation model and/or the stiffness or stress gradients from the formation model may be utilized to determine or estimate mechanical properties and/or other suitable properties or conditions (e.g., which may or may not be related to the mechanical properties) of the subsurface formation. Example properties or conditions of the subsurface formation that may be determined or estimated include, but are not limited to, vertical stress, pore pressure, minimum horizontal stresses, etc. One or more of a variety of techniques for determining or identifying properties or conditions (e.g., stresses) of subsurface formations may be utilized.

One example technique for determining or identifying properties or conditions of subsurface formations includes using a lithostatic model, for example, as discussed in Engelder, T., 1993. *Stress regimes in the lithosphere*, Princeton Univ. Press., which is hereby incorporated by reference in its entirety. Another example technique for determining or identifying properties or conditions of subsurface formations includes using a frictional equilibrium method, for example, as discussed in Brace, W. F. & Kohlstedt, D. L., 1980. *Limits on lithospheric stress imposed by laboratory experiments*, J. Geophys. Res., 85(B11), 6248-5252, which is hereby incorporated by reference in its entirety, and Jaeger, J. C., Cook, N. G. W., & Zimmerman, R. W., 2007. *Fundamentals of rock mechanics*, Blackwell Publishing. Another example technique for determining or identifying properties or conditions of subsurface formations includes using a laterally constrained model, for example, as discussed in Terzaghi, K. & Richart, F. E., 1952. *Stresses in rock about cavities*, G'eotechnique, 3(2), 57-90, which is hereby incorporated by reference in its entirety, and Eaton, B. A., 1969. *Fracture gradient prediction and its application in oilfield operations*, J. Pet. Technol., 246, 1353-1360, which is hereby incorporated by reference in its entirety. Another example technique for determining or identifying properties or conditions of subsurface formations includes using an extended Eaton method, for example, as discussed in Savage, W. Z., Swolfs, H. S., & Amadei, B., 1992. *On the stress in the near-surface of the Earth's crust*, Pure Appl. Geophys., 138(2), 207-228, which is hereby incorporated by reference in its entirety, and Thiercelin, M. J. & Plumb, R. A., 1994. *Core-based prediction of lithologic stress contrasts in East Texas formations*, SPE Form. Eval., 9(4), 251-258, which is hereby incorporated by reference in its entirety. Another example technique for determining or identifying properties or conditions of subsurface formations includes using a Maxwell viscoelastic model, as discussed in Savage et al. 1992, which was incorporated by reference in its entirety above, Warpinski, N. R., 1986. *Elastic and viscoelastic model of the stress history of sedimentary rocks*, Tech. Rep. Sand 86-0238, Sandia National Laboratories, which is hereby incorporated by reference in its entirety, and Warpinski, N. R., 1989. *Elastic and vis-

*coelastic calculations of stresses in sedimentary basins*, SPE Formation Evaluation, 4, which is hereby incorporated by reference in its entirety.

As referred to above, the system and techniques discussed herein may be utilized to capture information sufficient to provide a continuous well log of horizontal stresses and/or material properties of subsurface formation material along a length of a wellbore. That is, the techniques discussed herein may be repeatedly performed throughout the length of the wellbore so as to provide a completely continuous log of fine-scale mechanical properties and/or horizontal stress estimates.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for determining elastic properties of a formation along a wellbore, the method comprising:
    initiating application of perturbations to a casing of a length of the wellbore at a discrete location of the casing from within a lumen of the casing, the perturbations causing a force to be applied to the casing of the length of the wellbore;
    determining a value related to stress applied to the discrete location of the casing along the length of the wellbore based on the force applied to the casing;
    identifying a value related to strain on the casing at the discrete location of the casing resultant from the value related to the stress applied to the discrete location of the casing; and
    determining a value related to an elastic property of a formation extending along the length of the wellbore based on the value related to the stress applied to the casing and the value related to the strain resultant from the stress applied to the casing of the length of the wellbore.

2. The method of claim 1, wherein the formation extending along the length of the wellbore extends along an exterior of the casing of the length of the wellbore.

3. The method of claim 1, wherein:
    the formation extending along the length of the wellbore has a plurality of layers; and
    determining a value related to the elastic property for the formation extending along the length of the wellbore includes determining the elastic property for each layer of the plurality of layers of the formation.

4. The method of claim 1, further comprising:
    receiving values of a parameter measured by a distributed strain sensing system extending along the length of the wellbore and through a wall of the casing.

5. The method of claim 4, wherein the identifying the value related to the strain resultant from the stress applied to the casing of the length of the wellbore includes determining the value related to strain resultant from the stress applied to the casing of the length of the wellbore based on received values of the parameter measured by the distributed strain sensing system.

6. The method of claim 1, wherein:
    the initiating application of the perturbations to a casing of a length of the wellbore comprises initiating application perturbations to the casing at the discrete location of the casing at a first time, t1, and at a second time, t2;
    the determining the value related to the stress applied to the discrete location of the casing along the length of the wellbore based on the force applied to the casing comprises determining a value of the stress applied to the casing at the discrete location of the wellbore at the first time, t1, and at the second time, t2;
    the identifying the value related to the strain resultant from the stress applied to the discrete location of the casing comprises determining a value related to the strain resultant from the stress applied to the casing at the discrete location at the first time, t1, and the second time, t2; and
    the determining the value related to the elastic property of a formation extending along the length of the wellbore based on the value related to the stress applied to the casing and the value related to the strain resultant from the stress applied to the casing of the length of the wellbore comprises determining a value related to the elastic property of the formation extending along the length of the wellbore at the first time, t1, and the second time, t2.

7. The method of claim 6, further comprising:
    determining a change in the value related to the elastic property determined at the first time, t1, and the value related to the elastic property determined at the second time, t2;
    comparing the change in the value related to the elastic property to a threshold level; and
    outputting a control action when the change in the value related to the elastic property reaches or goes beyond the threshold level.

8. The method of claim 1, wherein the initiating application of perturbations to the casing of the length of the wellbore, the determining the value related to the stress applied to the casing along the length of the wellbore, the identifying the value related to the strain resultant from the stress applied to the casing of the length of the wellbore, and determining the value related to the elastic property of the formation extending along the length of the wellbore are repeated at predetermined intervals.

9. The method of claim 8, further comprising:
    maintaining a database of values related to the elastic property of the formation extending along the length of the wellbore that are determined at each of the predetermined intervals.

10. The method of claim 1, further comprising:
    establishing a value related to a force to be applied by the perturbations to the casing of the length of the wellbore; and
    wherein the value related to the force is configured to avoid fracturing of the wellbore and avoid fracturing the formation extending along the length of the wellbore.

11. The method of claim 1, wherein the initiating application of perturbations to the casing of the length of the wellbore, the determining the value related to the stress applied to the casing along the length of the wellbore, the identifying the value related to the strain resultant from the stress applied to the casing of the length of the wellbore, and determining the value related to the elastic property of the formation extending along the length of the wellbore are repeated at a plurality of discrete locations of the casing.

12. The method of claim 1, wherein the value related to an elastic property of the formation is a value of an elastic property selected from the group consisting of an elastic modulus of the formation, a stiffness of the formation, and compressibility of the formation.

* * * * *